(12) United States Patent
Ronk

(10) Patent No.: US 7,410,349 B2
(45) Date of Patent: Aug. 12, 2008

(54) HIGH EFFICIENCY GEROTOR PUMP

(75) Inventor: Aaron Ronk, Lake George, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 173 days.

(21) Appl. No.: 10/973,965

(22) Filed: Oct. 26, 2004

(65) Prior Publication Data

US 2006/0088432 A1    Apr. 27, 2006

(51) Int. Cl.
*F03C 2/00* (2006.01)
*F04C 2/00* (2006.01)

(52) U.S. Cl. .................... 418/171; 418/135

(58) Field of Classification Search .......... 418/19–21, 418/131–133, 166, 171, 135
See application file for complete search history.

(56) References Cited

U.S. PATENT DOCUMENTS

| | | | | |
|---|---|---|---|---|
| 3,188,969 A | * | 6/1965 | Brundage | 418/171 |
| 3,695,791 A | * | 10/1972 | Brundage | 418/131 |
| 3,741,693 A | | 6/1973 | Stockton | |
| 4,193,746 A | | 3/1980 | Aman, Jr. | |
| 4,247,267 A | | 1/1981 | Lindtveit | |
| 4,253,803 A | * | 3/1981 | Wormmeester et al. | 418/171 |
| 5,085,187 A | * | 2/1992 | Black | 418/171 |
| 5,139,395 A | * | 8/1992 | Kemmner | 418/171 |
| 5,711,408 A | | 1/1998 | Dick | |
| 6,017,202 A | | 1/2000 | Durnack et al. | |
| 6,152,717 A | * | 11/2000 | Morita et al. | 418/171 |
| 6,688,866 B2 | * | 2/2004 | Lambert et al. | 418/171 |

FOREIGN PATENT DOCUMENTS

| | | | | |
|---|---|---|---|---|
| DE | 4315432 A1 | * | 11/1994 | 418/171 |
| GB | 2245935 A | * | 1/1992 | 418/171 |

* cited by examiner

*Primary Examiner*—Theresa Trieu
(74) *Attorney, Agent, or Firm*—Harness, Dickey & Pierce, P.L.C.

(57) ABSTRACT

A pump assembly includes a pump housing, a stator ring supported within the pump housing, and a pump ring also rotatably supported within the pump housing. The pump ring interfaces with the stator ring to define a plurality of variable volume pressure chambers. A cover plate covers the stator ring and pumping ring within the pump housing. The cover plate is axially displaceable relative to the pump housing and defines a wall of each of the pressure chambers. Pressure within the pressure chambers induces linear movement of the cover plate away from the stator ring and the pump ring.

17 Claims, 5 Drawing Sheets

HIGH EFFICIENCY GEROTOR PUMP

FIELD OF THE INVENTION

The present invention relates to fluid pumps, and more particularly to a high efficiency expanding gerotor pump.

BACKGROUND OF THE INVENTION

Gerotor pumps are commonly used in power transfer assembly of the type installed in motor vehicles for supplying lubrication to the rotary components as well as for cooling torque transfer assemblies such as, for example, multi-plate friction clutches. Such power transfer assemblies include manual and automatic transmissions, transaxles, power take-off units, all-wheel drive couplings and four-wheel drive transfer cases. Typically, the gerotor pump has an outer ring defining a pumping chamber and an inner ring that is positioned in the pumping chamber and which is fixed for rotation with a driven member (i.e., a shaft, etc.). The inner ring has external lobes which are meshed with, and eccentrically offset, from internal lobes formed on the outer ring. Because the number of internal lobes is greater than the number of external lobes, driven rotation of the inner ring results in a pumping action such that a supply of hydraulic fluid is drawn from a sump in the power transfer assembly into the suction side of the pumping chamber and is discharged from the pressure side of the pumping chamber at an increased pressure.

Traditionally, the gerotor pump is continuously driven regardless of the lubrication and/or cooling needs. In addition, as the rotational speed of the driven member increases, the pressure generated by the gerotor pump correspondingly increases. As a result, additional energy is used to drive the pump, thereby reducing the overall efficiency of the power transfer assembly.

SUMMARY OF THE INVENTION

Accordingly, the present invention is directed to a high efficiency expandable pump assembly. The pump assembly includes a pump housing, a stator ring that is supported within the pump housing, and a pump ring that is rotatably supported within the pump housing. The pump ring interfaces with the stator ring to define a plurality of variable volume pressure chambers. A cover plate covers the stator ring and pump ring within the pump housing. The cover plate is axially displaceable relative to the pump housing and defines a wall of each of the pressure chambers. The fluid pressure within each of the pressure chambers induces linear movement of the cover plate away from the stator ring and the pump ring.

In one feature, the stator ring and the pump ring move linearly based on the pressure within the pressure chambers such that each remain centered between the cover plate and the pump housing.

In other features, the pump assembly further includes a biasing member that biases the cover plate toward the stator ring and the pump ring. In accordance with a preferred construction, the biasing member is a resilient seal component having a circular doughnut-shaped cross-section. As an alternative, the biasing member may include a square shaped cross-section. In yet another alternative, the biasing member may include a D-shaped cross-section.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
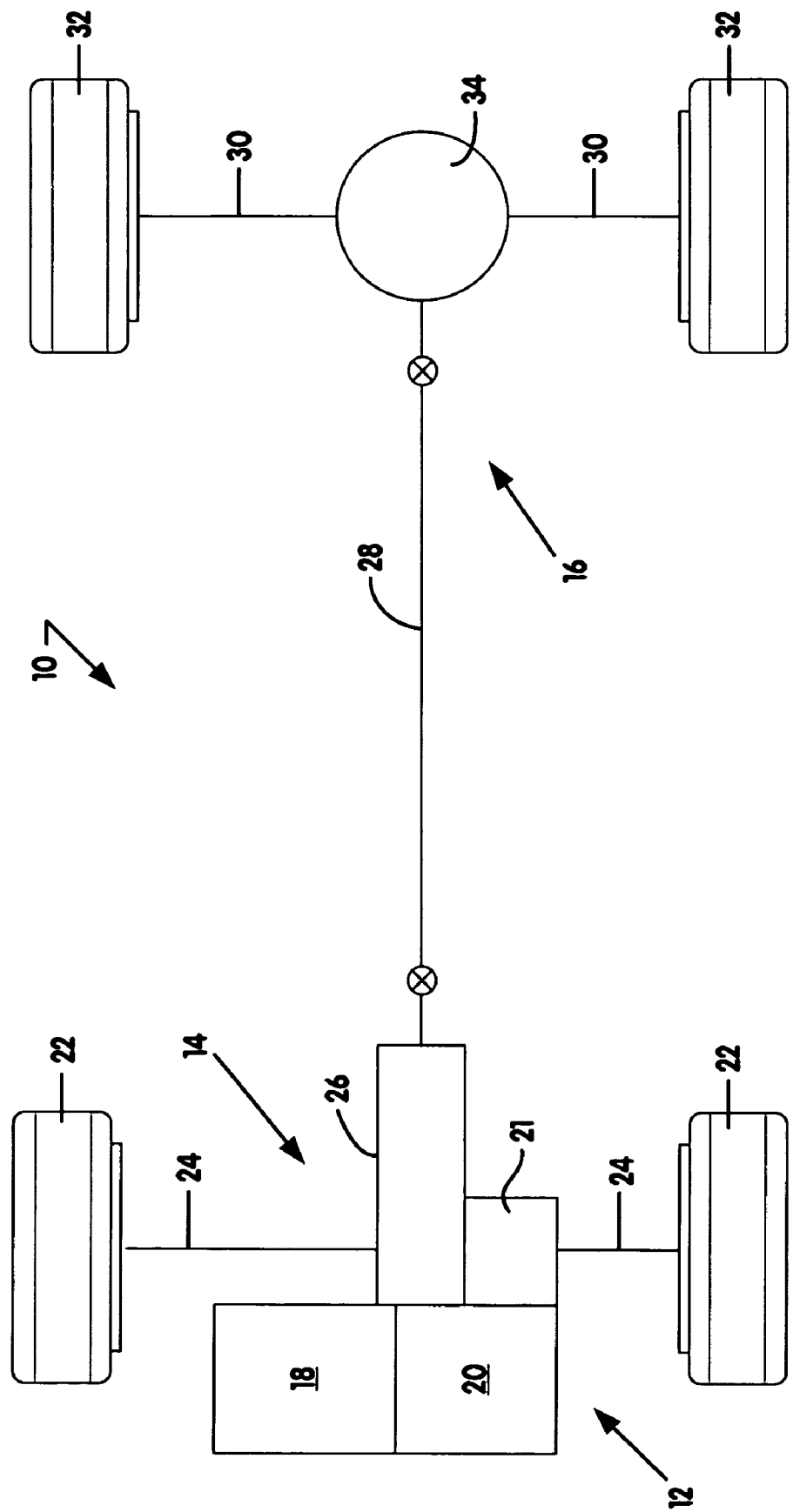
FIG. 1 is a schematic illustration of an exemplary vehicle drivetrain having one or more power transfer assemblies equipped with a high efficiency gerotor pump according to the present invention.

Referring primarily to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) through a front differential 21 to a pair of wheels 22 associated with primary driveline 14. In particular, primary driveline 14 includes a pair of halfshafts 24 connecting wheels 22 to front differential 21 associated with transaxle 20. Secondary driveline 16 includes a power take-off unit (PTU) 26 driven by transaxle 20, a prop shaft 28 driven by PTU 26, a pair of axleshafts 30 connected to a pair of wheels 32 and a drive axle assembly 34 operable to transfer drive torque from propshaft 28 to one or both axleshafts 30. As will be detailed, the present invention is directed to use on an improved fluid pump in any one of the power transfer assemblies associated with drivetrain 10 for the purpose of providing lubrication to the rotary components and/or hydraulic actuation of one or more torque transfer devices.

Figure 2:
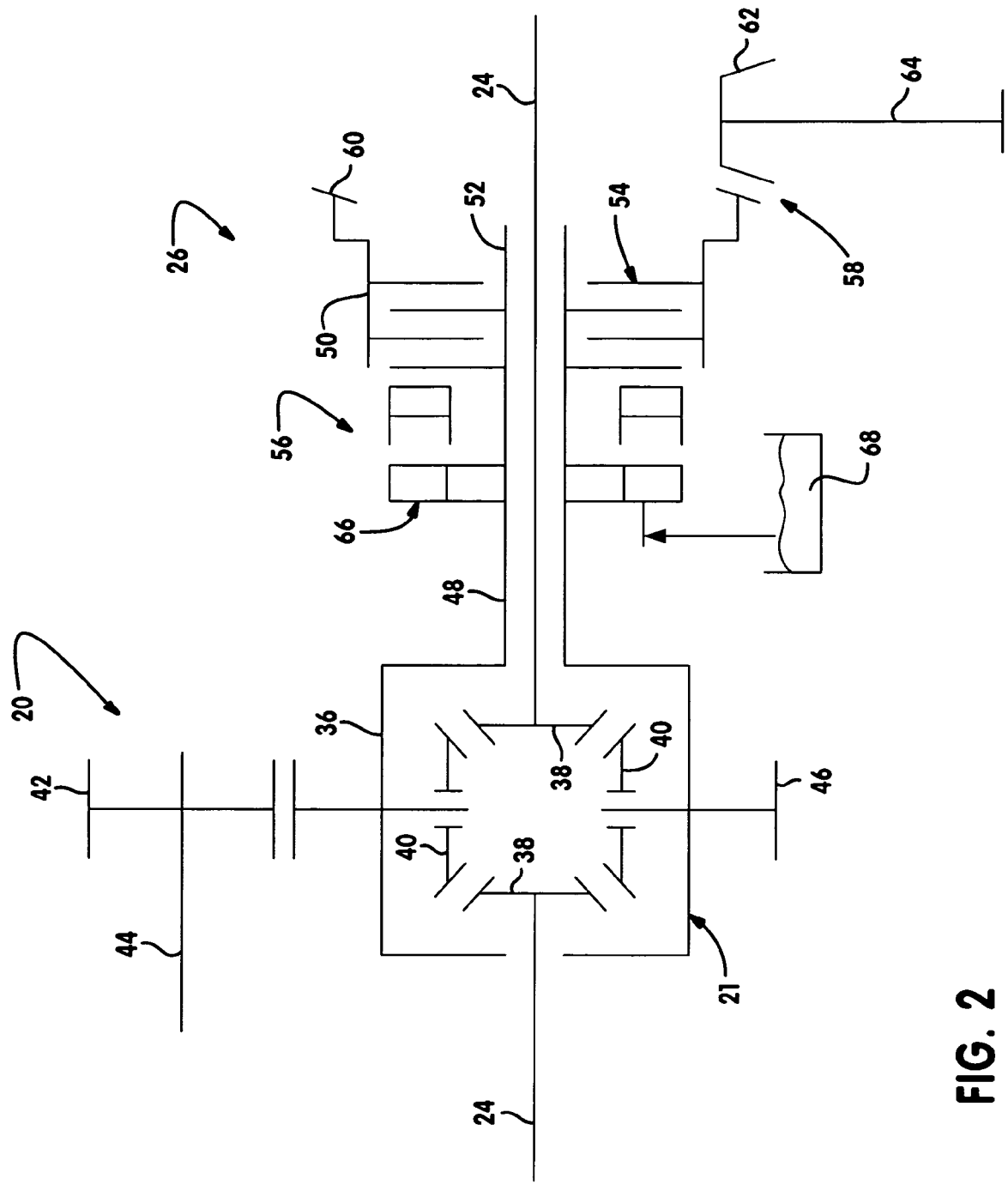
FIG. 2 is a schematic illustration of a power take-off unit equipped with the gerotor pump of the present invention.

Referring now to FIG. 2, PTU 26 is schematically shown in association with front differential 21 of transaxle 20. In particular, front differential 21 includes a carrier 36, a pair of side gears 38 that are fixed for driven rotation with axleshafts 24, and a pair of pinion gears 40 rotatably driven by carrier 36 and meshed with side gears 38. An output gear 42 on a transmission shaft 44 associated with transaxle 20 drives a drive gear 46 fixed to carrier 36 for transferring drive torque through front differential 21 to axleshafts 24.

PTU 26 is shown to include a transfer shaft 48 driven by carrier 36, a clutch drum 50, a hub 52 driven by transfer shaft 48, a clutch pack 54 disposed between drum 50 and hub 52, a clutch actuator 56 and a transfer gearset 58. As seen, transfer gearset 58 includes a ring gear 60 driven by drum 50 that is meshed with a pinion gear 62 fixed for rotation with a pinion shaft 64 that, in turn, drives prop shaft 28. Clutch actuator 56 is operable to generate and apply a clutch engagement force on clutch pack 54, thereby transferring drive torque from transfer shaft 48 to gearset 58 which, in turn, transfers such drive torque to rear axle assembly 24 via prop shaft 28. Actuator 56 includes a fluid pump 66 driven by transfer shaft 48, a source of hydraulic fluid such as sump 68, and a piston 70 disposed in a pressure chamber. Pump 66 is operable to draw fluid from sump 68 and deliver high pressure fluid to the pressure chamber for controlling sliding movement of piston 70 relative to clutch pack 54, in turn, and the magnitude of the clutch engagement force exerted thereon. In addition to clutch actuation, pump 66 functions to draw fluid from sump 68 and supply fluid through lubrication and/or cooling flow paths to cool clutch pack 54 and lubricate various rotary components of PTU 26 and differential 21.

Figure 3:
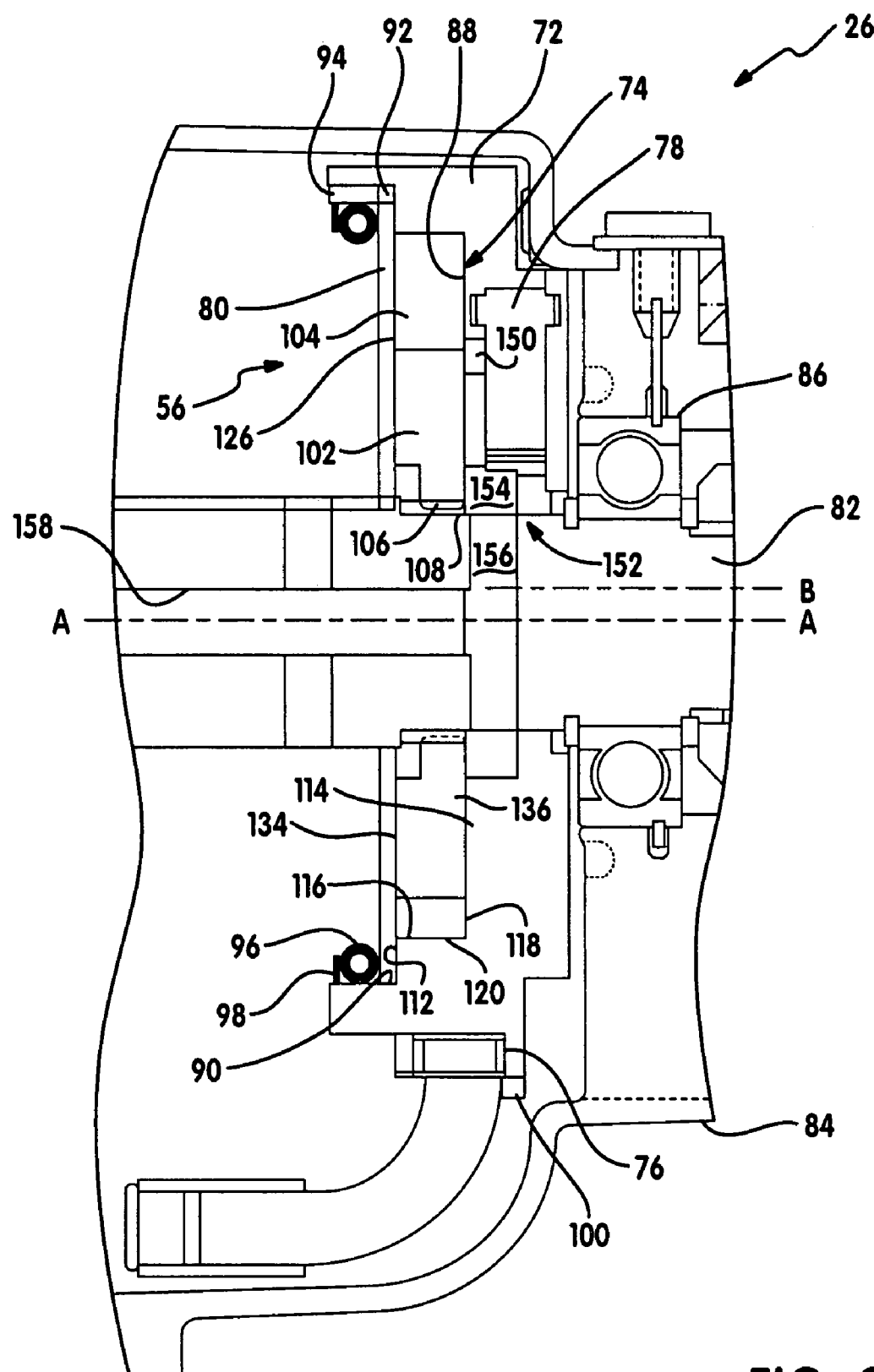
FIG. 3 is a partial cross-sectional view of a power transfer assembly equipped with a high efficiency gerotor pump according to the present invention.

Fluid pump 66 is a bidirectional rotary-driven gerator pump. A similar gerotor pump is disclosed in commonly assigned U.S. Pat. No. 6,017,202, issued Jan. 25, 2000 and which is expressly incorporated herein by reference. Gerotor pump 66 is contemplated for use in any pump applications requiring a supply of fluid to be delivered to a single pump outlet regardless of the direction of rotation, as discussed further below. Referring to FIG. 3, gerotor pump 66 is shown to include a pump housing 72, a gerotor assembly 74, an inlet valve assembly 76, and an outlet valve assembly 78. Gerotor pump 66 is a self-contained unit and includes a cover plate 80. Components of gerotor pump 66 are disposed within pump housing 72 and are covered by cover plate 80.

Figure 5:
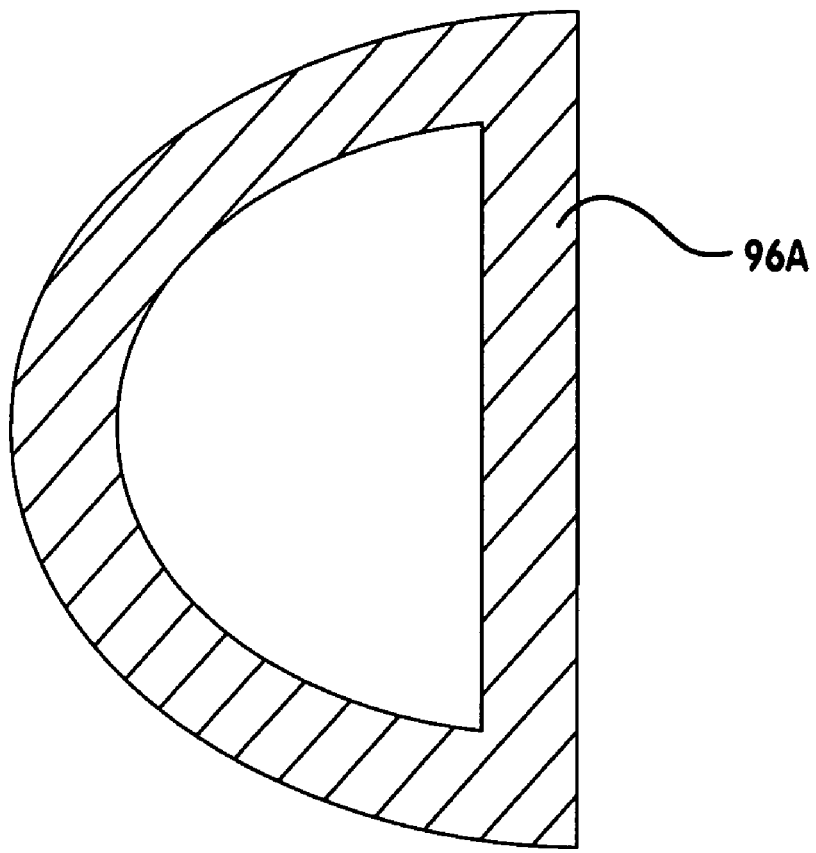
FIG. 5 is a cross-sectional view of an alternative biasing member of the gerotor pump.
Figure 6:
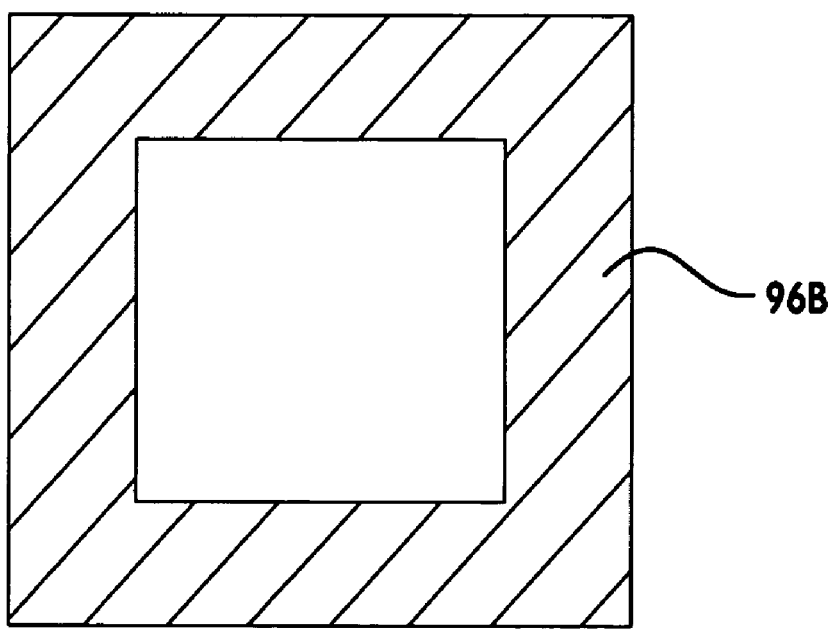
FIG. 6 is a cross-sectional view of another alternative biasing member of the gerotor pump.

Gerotor pump 66 can be installed within exemplary PTU 26, which includes a shaft 82 that is rotatably supported in a housing 84 via a bearing assembly 86. Shaft 82 is rotatable about a first rotary axis "A". Gerotor assembly 74 is seated within a cavity 88 in pump housing 72. Cover plate 80 is slidably disposed within a recess 90 in pump housing 72 and is adapted to enclose gerotor assembly 74 within cavity 88 of pump housing 72. Cover plate 80 includes an anti-rotation tab 92 that is retained in a slot 94 formed in housing 72. In addition, a biasing member 96 is disposed between cover plate 60 and a retention ring 98. Biasing member 96 is preferably constructed as an annular resilient component, such as a rubber ring seal. Although biasing member 96 is illustrated having a doughnut-shaped cross-section, it is anticipated that other cross-sections can be implemented. More particularly, FIGS. 5 and 6 respectively illustrate a D-shaped cross-section and a square-shaped cross-section. Pump housing 72 can be non-rotatably fixed to case 84 in a number of manners including, but not limited to a series of radially-extending tabs 100, which are adapted for receipt in complementary keyways (not shown) formed in the housing 84.

Gerotor assembly 74 includes a pump ring 102 and a stator ring 104. Pump ring 102 has a central aperture with internal splines 106 adapted for meshed engagement with external splines 108 formed on shaft 82. In this manner, pump ring 102 is fixed for rotation with shaft 82 to rotate about first rotary axis "A". Rotation of shaft 82 induces rotation of pump ring 102, which draws hydraulic fluid through an inlet hose 110 from the sump area. Stator ring 104 is supported in cavity or pump chamber 88 formed in pump housing 72. Pump chamber 88 is circular and extends inwardly from a front face 112 of pump housing 72. Pump chamber 88 is defined by a planar pump surface 114, which is parallel to the front face 112 and a circumferential side wall 116 that extends transversely with respect to pump surface 114. Further, the origin of pump chamber 88 is radially offset from the first rotary axis "A" of shaft 82 and is shown by construction line "B" in FIG. 3. Thus, stator ring 104 is retained within pump chamber 88 such that its rear surface 118 abuts pump surface 114 while its peripheral edge surface 120 abuts outer side wall 116.

Stator ring 104 includes a generally sinusoidal aperture defined by an inner peripheral surface 124 formed between a front surface 126 and rear surface 118. Inner peripheral surface 124 defines a series of lobes 128 interconnected by a series of recessed root segments 130. Pump ring 102 has an outer peripheral surface 132 defined between a front surface 134 and a rear surface 136. Outer peripheral surface 132 defines a series of external lobes 138 interconnected by a series of web segments 140. In the embodiment shown, stator ring 104 has seven lobes 128 while pump ring 102 has six lobes 138. Alternative numbers of lobes can be used to vary the pumping capacity, whereby the number of lobes 128 on stator ring 104 is one greater than the number of lobes 138 on pump ring 102.

Figure 4:
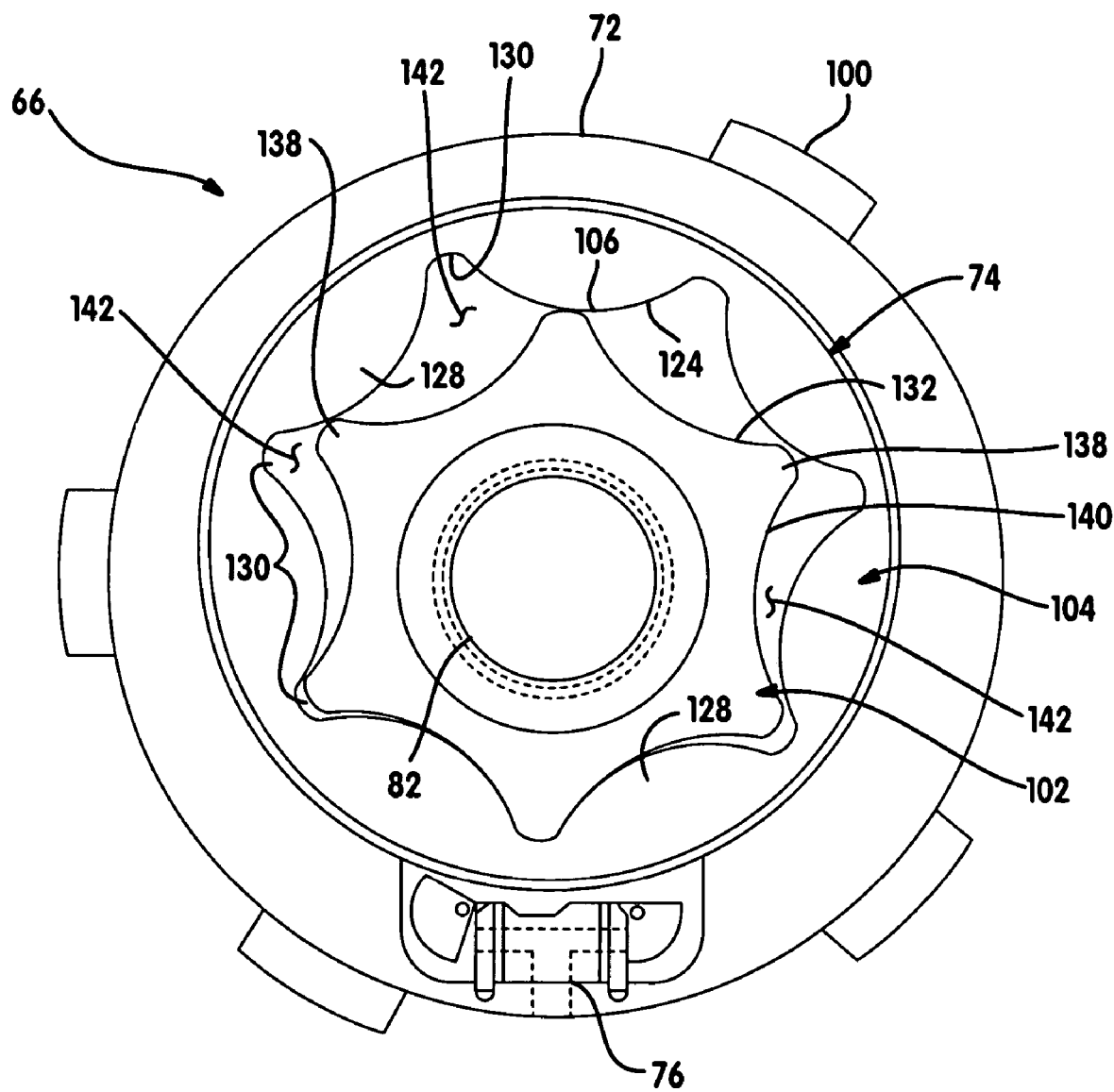
FIG. 4 is a plan view of components of the gerotor pump.

With particular reference to FIG. 4, pump ring 102 is shown with its outer peripheral surface 132 engaged with various points along inner peripheral surface 124 of stator ring 104 to define a series of pressure chambers 142 therebetween. More specifically, pressure chambers 142 are defined by peripheral surfaces 124 and 132, pump surface 114 and cover plate 80. Upon rotation of pump ring 102 about the "A" axis, stator ring 104 is induced to rotate in pump chamber 88 about the "B" axis at a reduced speed relative to the rotary speed of pump ring 102. This induces a progressive reduction in the size of pressure chambers 142 to generate a pumping action. More specifically, low pressure fluid is drawn from sump 68 into pressure chambers 142 through inlet valve assembly 76 and high pressure fluid is exhausted from pressure chambers 142 through outlet valve assembly 78. As is known, inlet valve assembly 76 functions to permit fluid to be supplied to inlet chambers (not shown) formed in pump housing 72 while outlet valve assembly 78 controls fluid delivery from outlet chambers 150 in pump housing 72 to a discharge flowpath 152. Flowpath 152 is shown to include an annular chamber 154 in pump housing 72 that communicates with a series of radial ports 156 in shaft 82. Ports 156 communicate with a central passage 158 which is used to provide pressurized fluid to locations along shaft 82.

As pumping ring 102 and stator ring 104 are induced to rotate, they rub against pump housing surface 114 and cover plate 80. This would typically result in pumping inefficiencies and energy losses. However, as the speed differential between pump ring 102 and stator ring 104 increases, the pressure within the pressure chambers 142 correspondingly increases. Eventually, there is sufficient pressure build-up within pressure chambers 142 to impart a linear force on cover plate 80, inducing cover plate 80 to move away from gerotor assembly 74 and resiliently push against biasing member 96. In this manner, when the fluid pressure achieves a predetermined threshold, cover plate 80 is induced to move which, in turn, functions to increase the volume of pressure chambers 142.

Opening of pressure chambers 142 results in an increase in the gap between cover plate 80 and pump surface 114. Pump ring 102 and stator ring 104 automatically center themselves between cover plate 80 and pump surface 114. In this manner, pump ring 102 and stator ring 104 are offset from both cover plate 80 and pump housing surface 114. Fluid is able to seep in between the pump components and cover plate 80 and in between the pump components and pump surface 114 to lubricate the interface therebetween. Viscous forces within gerotor pump 66 drop and pumping efficiency is increased.

As the gap between cover plate 80 and pump surface 114 increases a threshold point is achieved, whereby the pressure within pressure chambers 142 decreases. As the pressure within pressure chambers 142 decreases, the biasing force of biasing member 96 induces cover plate 80 to move back toward gerotor assembly 74, thereby closing pressure chambers 142. Closing of pressure chambers 142 results in a pressure increase within pressure chambers 142, as described above. Eventually, the gap between cover plate 80 and pump surface 114 stabilizes as a balance is achieved between the linear force generated by the fluid pressure within pressure chambers 142 and the biasing force of biasing member 96 balance. In this manner, losses incurred as a result of the continuous pumping action of gerotor pump 66 are significantly reduced by the reduced viscous forces between the pump components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pump assembly, comprising:
    a pump housing and a cover plate defining a pump cavity;
    a stator ring supported within said pump cavity in said pump housing;
    a pump ring rotatably supported within said pump cavity in said pump housing and which interfaces with said stator ring to define a plurality of variable volume pressure chambers;
    said cover plate covering said stator ring and said pump ring within said pump cavity, said cover plate being axially displaceable relative to said pump housing and defining a wall of each of said pressure chambers; and
    a biasing member that biases said cover plate toward said stator ring and said pump ring, wherein fluid pressure within said pressure chambers induces movement of said cover plate away from said stator ring and said pump ring, wherein said biasing member exerts a force having a magnitude allowing said stator ring and said pump ring to move based on the fluid pressure within said pressure chambers such that each translates to a position centered between said cover plate and said pump housing.

2. The pump assembly of claim 1 wherein said biasing member is a resilient gasket.

3. The pump assembly of claim 1 wherein said biasing member includes a circular cross-section.

4. The pump assembly of claim 3 wherein said circular cross-section is a doughnut-shaped cross-section.

5. The pump assembly of claim 1 wherein said biasing member includes a square shaped cross-section.

6. The pump assembly of claim 1 wherein said biasing member includes a D-shaped cross-section.

7. A pump assembly, comprising:
    a pump housing including a first recess partially defined by a pump surface and a second recess partially defined by a stop face;
    a stator ring supported within said first recess and including an inner circumferential surface;
    a pump ring rotatably supported within said first recess and including an outer circumferential surface;
    a cover plate positioned within said second recess and covering said stator ring and said pump ring within said first recess, said cover plate being axially displaceable relative to said pump housing in a direction away from said stator and pump rings and restricted from movement in an opposite direction by said stop face; and
    a plurality of variable volume pressure chambers defined by said cover plate, said outer circumferential surface, said inner circumferential surface and said pump surface, wherein fluid pressure within said pressure chambers induces linear movement of said cover plate away from said stator ring and said pump ring, wherein fluid pressure within said pressure chambers induces corresponding linear movement of said stator ring and said pump ring such that each remain centered between said cover plate and said pump housing.

8. The pump assembly of claim 7 further comprising a biasing member that biases said cover plate toward said stator ring and said pump ring.

9. The pump assembly of claim 8 wherein said biasing member is a resilient gasket.

10. The pump assembly of claim 9 wherein said biasing member includes a circular cross-section.

11. The pump assembly of claim 10 wherein said circular cross-section is a doughnut-shaped cross-section.

12. The pump assembly of claim 8 wherein said biasing member includes a square shaped cross-section.

13. The pump assembly of claim 8 wherein said biasing member includes a D-shaped cross-section.

14. A pump assembly, comprising:
    a pump housing defining a pump cavity with an end surface;
    a stator ring supported within said pump cavity adjacent said end surface;
    a pump ring rotatably supported within said pump cavity adjacent said end surface and which interfaces with said stator ring to define a plurality of variable volume pressure chambers; and
    a cover plate covering said stator ring and said pump ring, being axially displaceable relative to said pump housing and defining a wall of each of said pressure chambers, wherein an increase in the fluid pressure within said pressure chambers induces movement of said cover plate away from said stator ring and said pump ring, wherein said stator ring and said pump ring move based on the fluid pressure within said pressure chambers such that each remains spaced apart from said cover plate and said end surface of said pump housing.

15. The pump assembly of claim 14 wherein said cover plate is positioned within a recess in communication with said pump cavity, said cover plate being in biased engagement with a stop face restricting movement of said cover plate toward said stator ring.

16. The pump assembly of claim 15 further including an elastomeric ring positioned within said recess and biasing said cover plate.

17. The pump assembly of claim 16 wherein said elastomeric ring is restricted from movement by a retaining ring fixed to said pump housing and positioned within said recess.

* * * * *